United States Patent [19]

Raboisson et al.

[11] Patent Number: 5,706,355
[45] Date of Patent: Jan. 6, 1998

[54] METHOD OF ANALYZING SEQUENCES OF ROAD IMAGES, DEVICE FOR IMPLEMENTING IT AND ITS APPLICATION TO DETECTING OBSTACLES

[75] Inventors: Stéphane Raboisson, Thorigne Fouillard; Gilles Even, Rennes, both of France

[73] Assignee: Thomson-CSF, Paris, France

[21] Appl. No.: 715,248

[22] Filed: Sep. 19, 1996

Related U.S. Application Data

[63] Continuation of Ser. No. 477,714, Jun. 7, 1995, abandoned, which is a continuation of Ser. No. 170,257, filed as PCT/FR92/00329, Apr. 14, 1993, published as WO93/21596, Oct. 28, 1993, abandoned.

[51] Int. Cl.$^6$ ............................................. G06K 9/00
[52] U.S. Cl. .................... 382/104; 382/100; 382/266; 382/272; 364/436; 395/131
[58] Field of Search .......................... 382/100, 190, 382/215, 104, 272; 364/436; 395/131

[56] References Cited

U.S. PATENT DOCUMENTS

| | | | |
|---|---|---|---|
| 4,630,109 | 12/1986 | Barton | 364/424.02 |
| 4,797,738 | 1/1989 | Kashi et al. | 382/17 |
| 4,926,346 | 5/1990 | Yokoyama | 364/424.02 |
| 4,970,653 | 11/1990 | Kenue | 364/424.02 |
| 5,122,957 | 6/1992 | Hattori | 382/1 |
| 5,172,423 | 12/1992 | France | 382/17 |
| 5,220,508 | 6/1993 | Ninomiya et al. | 364/449 |
| 5,247,583 | 9/1993 | Kato et al. | 382/164 |
| 5,301,239 | 4/1994 | Toyama et al. | 382/100 |
| 5,307,419 | 4/1994 | Tsujino et al. | 382/1 |
| 5,535,314 | 7/1996 | Alves et al. | 395/131 |

FOREIGN PATENT DOCUMENTS

| | | | |
|---|---|---|---|
| 0361914 | 4/1990 | European Pat. Off. | |

OTHER PUBLICATIONS

Proceedings of the First International Conference on Computer Vision, London, 8–11 Jun. 1987 New York, pp. 557–566. Darvin Kuan, et al. "Autonomous Land Vehicle Road Following".

Proceedings of the 22nd Asilomar Conference on Signals, Systems and Computers, Pacific Grove, California, vol. 1., Oct. 31, 1988, F. Cartosio, et al. "A Fuzzy Data–Fusion approach to segmentation of colour images".

*Primary Examiner*—Jose L. Couso
*Assistant Examiner*—Anh Hong Do
*Attorney, Agent, or Firm*—Oblon, Spivak, McClelland, Maier & Neustadt, P.C.

[57] ABSTRACT

A method and system of analyzing sequences of road images taken by a camera carried on board of a vehicle. A luminance signal of the road images from which contours of the road are extracted is generated. An analysis of color video signals based on the fact that the colorimetric components of a road region in an image do not include a green or red dominant is then combined with the luminance signal processing, in order to confirm, with good reliability, the limits of the road in the image on the basis of the contours. A mask of the road is then established. This method and system are applicable, in particular, to detecting obstacles on the road, and the information which it generates may be combined with information originating from other detectors in an obstacle detection system applicable to motor vehicle traffic.

8 Claims, 6 Drawing Sheets

SUBPROGRAM: COLOR SP

SUB PROGRAM: SEARCH SP

METHOD OF ANALYZING SEQUENCES OF ROAD IMAGES, DEVICE FOR IMPLEMENTING IT AND ITS APPLICATION TO DETECTING OBSTACLES

This application is a continuation of application Ser. No. 08/477,714, filed on Jun. 7, 1995, now abandoned, which is a continuation of application Ser. No. 08/170,257, filed on Dec. 14, 1993, abandoned, which was filed as International Application No. PCT/FR92/00329 on Apr. 14, 1992, published as WO93/21596 Oct. 28, 1993.

DISCUSSION OF THE BACKGROUND

1. Field of the Invention

The invention relates to the field of image processing, and its subject, more particularly, is a method of analyzing sequences of road images with a view to extracting roads, a device for implementing it, and its application to detecting obstacles.

2. Discussion of the Background

Extracting information relating to the road, by the use of images, has been researched in the context of applications employing vehicles of moving robot type. Road detection from images has been developed ever since it was desired to make these moving robot-type machines independent.

In general, processing in this field consists in analyzing the information delivered by a camera with a CCD sensor, in the form of a color video signal. The images output by the camera carried by the moving object are held in memory, where they are sent to various processing modules.

The conventional methods for determining contours have been widely employed for detecting the road edges, with greater or lesser success due to the problems of shadows cast onto the road. In fact, an approach of the geometrical modelling type relating to the search for bold segments on the images may not best correspond to the straight-line model desired, especially in the case of non-optimal conditions for image taking (bad weather, noisy data, etc.).

The following publications relate to this work:

by C. THORPE et al: "Vision and navigation for the Carnegie-MELLON Navlab" I.E.E.E. Transactions on pattern analysis and machine intelligence, vol. 10, no. 3, p. 362–373, May 1988;

by J. M. LOWRIE et al: "The Autonomous Land Vehicle preliminary road-following demonstration" Proc. SPIE 579 D. P. CASAENT Ed; p. 336–350, September 1985.

by M. TURK et al: "VITS: A vision system for Autonomous Land Vehicle navigation" I.E.E.E. Trans. PAMI, Vol. 10, no. 3, p. 343–361, May 1988.

These works cannot be applied to the case of motor vehicle traffic on freeways, with a view to applications in the field of road safety, due to the constraints imposed by this type of application: high speeds and dense traffic.

In the context of detecting obstacles "Hughes Artificial Intelligence Center" has developed telemetry techniques coupled to knowledge bases. Reference will be made to the works of M. J. DAILY et al: "Detecting obstacles in range imagery" Proc. DARPA Image Understanding Workshop, p. 87–97, February 1987. The advantage of such a method, using telemetry, resides in the possibility of directly obtaining the differences separating the vehicle from potential obstacles, getting over problems of illumination of the scenes. In contrast, the radiation of the waves transmitted may be a drawback for remaining in conformity with the necessary safety standards.

In a general way, the use of an optical image sensor associated with a method of image processing makes it possible to put together an organ of perception for the motor vehicle. That being so, it is possible to envisage a large number of applications based on analyzing the image and interpreting the scene. However, in this context, the main elements constituting the scene are the road and the objects to be found thereon. It is therefore essential, prior to any image interpretation, to extract and locate the road with respect to which the rest of the scene may then be described.

Numerous segmentation techniques are conventionally used, in image processing, to group regions together, under constraints of similarity of characteristics.

The segmentation of external natural scenes is a particularly complex operation if it has to take account of all the elements constituting the scenes. The conditions relating to the environment and their variations only accentuate this difficulty: (different seasons, weather, illumination, times of image taking: spectral reflection when the sun is low, shadows, mud on the roadway, etc.).

SUMMARY OF THE INVENTION

The object of the invention is the development of a method of analyzing sequences of road images with a view to extracting carriageways (roads) and detecting obstacles on the basis of these images.

The subject of the invention is a sophisticated method of analyzing sequences of road images making it possible to obtain information relating to the road and possibly to the obstacles likely to be found thereon, applicable even to traffic on freeways, particularly with a view to enhancing safety in driving a motor vehicle. From this information, certain functions may be automated, and an extension of the perception capacity of the driver can be envisaged, especially for long journeys on a freeway, by triggering alarms or signalling danger.

According to the invention, the method of analyzing sequences of road images with a view to extracting roads from the images, includes:

- a first step of analyzing the luminance information of the image video signals in order to extract the contours and regions of the images and establish a mask of the road,
- a second step of analyzing the color video signals in the course of which the image is partitioned over the points which it is certain cannot belong to the road,
- a third step which combines the information originating from the step of analyzing the luminance and from the color analysis step, for final extraction of the road.

The subject of the invention is also a device for analyzing sequences of road images originating from a camera and available in the form of digital color components and, after conversion of the color components, in the form of a luminance component, intended for implementing the analysis method as described above, and which includes

- a contour and regions analysis device, the input of which is intended to receive the image luminance signal associated with a device for predetermining the horizontal markings,
- a color analysis device, the input of which is intended to receive the three color components, constituting the video image,
- and a road extraction device linked to the outputs of the contours and regions analysis device and of the color analysis device.

The subject of the invention is also the application of this method in an obstacle detection system applicable to road traffic in which the analysis of sequences of video images of roads leads to extracting roads from the images and possibly to locating obstacles when the mask of the road is discontinuous.

BRIEF DESCRIPTION OF THE DRAWINGS

The invention will be better understood and other characteristics will appear with the aid of the description which follows, by reference to the attached figures.

DESCRIPTION OF THE PREFERRED EMBODIMENTS

As indicated above, the invention relates mainly to extracting the road and detecting anomalies on the carriageways such as, for example, problems of surfacing on the roadway, or objects or vehicles coming into the limited safety zone around the wheeled vehicle, on the basis of analysis of a sequence of road images.

The diversity in the natural conditions of illumination and of appearance of the roadway necessitates a "robust" extraction method. Starting with the assumption that, at any moment, the vehicle is rolling on the road and that the camera, fixed, for example, in the region of the interior rear-view mirror, receives the information relating to the road and to the possible obstacles to be found thereon, the proposed viewing device "learns", iteratively, then "recognizes" the appearance of the surfacing of the roadway. The method of extracting the surface of the road from the image is based on the analysis of characteristics of the carriageways in near field (learning) and on the segmentation of the road in perspective (recognition). Image processing has the aim of seeking the characterization attributes necessary, that is to say contour/region information and specific color data relating to the colorimetric composition of the roadway with respect to the background.

For implementing this processing, the invention uses simple operators, easy to implement in an architecture dedicated to this function. A single video sensor is used for implementing the analysis method as described below, which is an important economic factor as far as the cost of production is concerned. However, the addition of other sensors of the same type (CCD camera) or of other types (lidar, radar, rate gyro, etc) makes it possible to increase the analysis capabilities, such as stereo vision, reconstruction of three-dimensional information and active detection of obstacles on the road, in a composite obstacle detection system.

Figure 1:
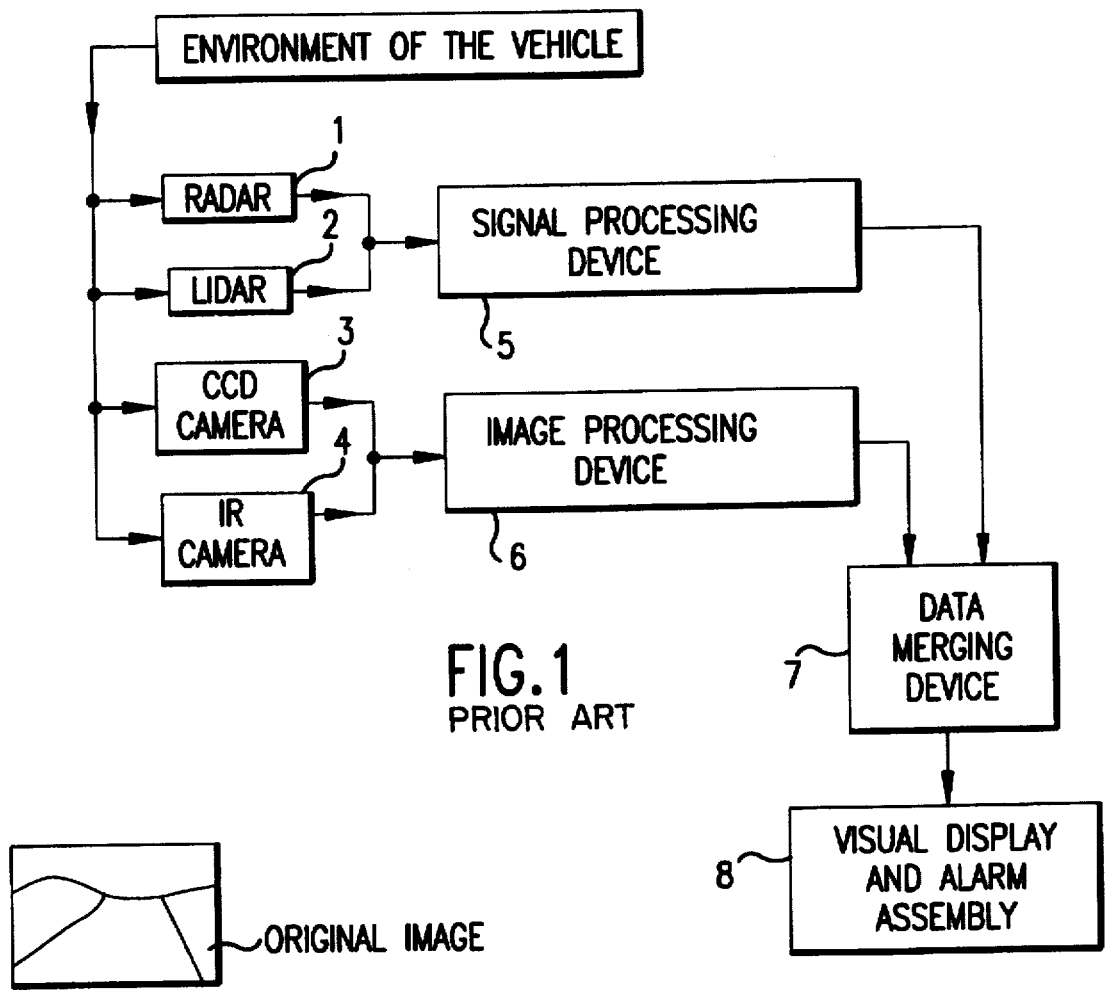
FIG. 1 is a general diagram of an obstacle detection system applicable to motor vehicle safety.

The structure of such a composite obstacle detection system is illustrated in FIG. 1.

The environment of the vehicle is analyzed, for example from 4 types of information: information detected by a radar 1, information detected by a lidar 2, images taken by a CCD camera, 3 (using a charge-coupled sensor), and images taken by an infrared camera IR, 4. The signals coming from the radar and from the lidar are processed by a signal processing device 5, while the images obtained from the cameras are processed by an image processing device 6. A device 7 for merging all the data resulting from these processings is then used to generate images and/or alarms on a visual display and alarm triggering assembly 8 arranged on the dashboard of the vehicle.

The method according to the invention more particularly relates to the image processing employed by the device 6 for extracting roads from these images.

Figure 2:
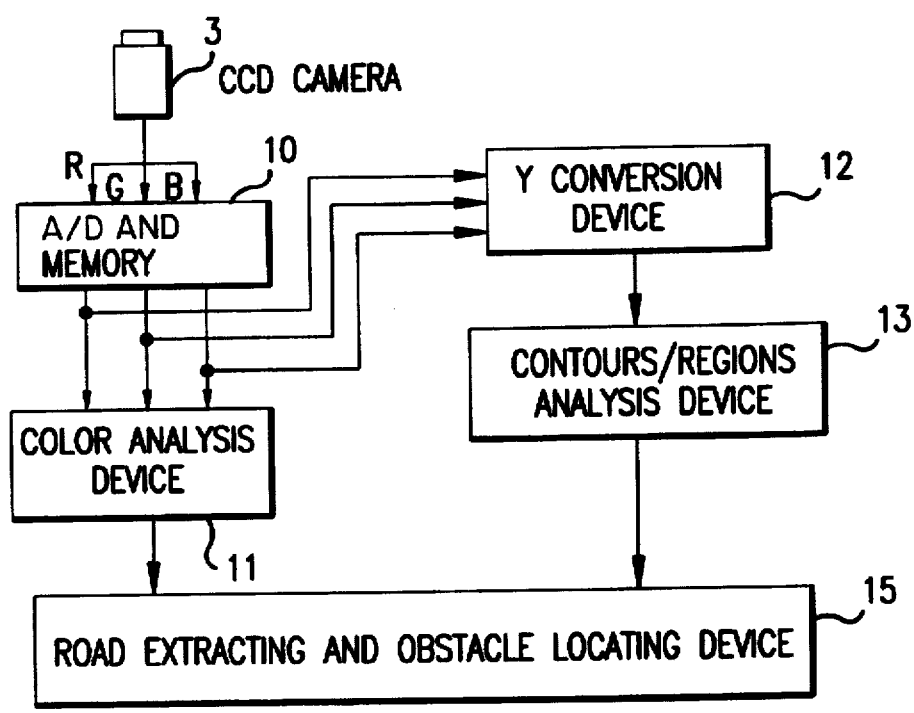
FIG. 2 is the block diagram of the image analysis device for extracting roads according to the invention.

FIG. 2 is the block diagram of the image analysis device for extracting roads according to the invention. The image of the environment of the vehicle is taken by the CCD camera 3. From the three analog color signals supplied by this camera, an assembly 10 including an analog-digital (A/D) converter converts these three signals into series of digital values; a timebase circuit and an image memory are conventionally associated with this converter in the assembly 10; these images are sent, on the one hand, to a color analysis device 11, and, on the other hand, to a conversion device 12 combining the color components in order to reproduce a series of digital values characterizing the luminance Y of the image points. The series of luminance values is sent to a contour and region analysis device 13. The information coming, on the one hand, from the color analysis device 11 and, on the other hand, from the device 13 are sent to a road extracting and obstacle locating device 15.

The processing method proper thus includes three steps:

The first step includes in a joint analysis of the contours and regions for detecting the road. It uses the luminance information from the video signals.

The second step, in parallel with the first, rests on an analysis of the color signals (R-G-B), so as to establish a global mask over the image, intended to confirm the presence and the position of the road.

The third step includes, as described in detail below, in judiciously using the information extracted by the contour/region analysis and the color analysis in order to arrive at a precise detection of the road.

The carriageways, or roads, once extracted, allow the maneuvering area of the vehicle to be determined.

Figure 3:
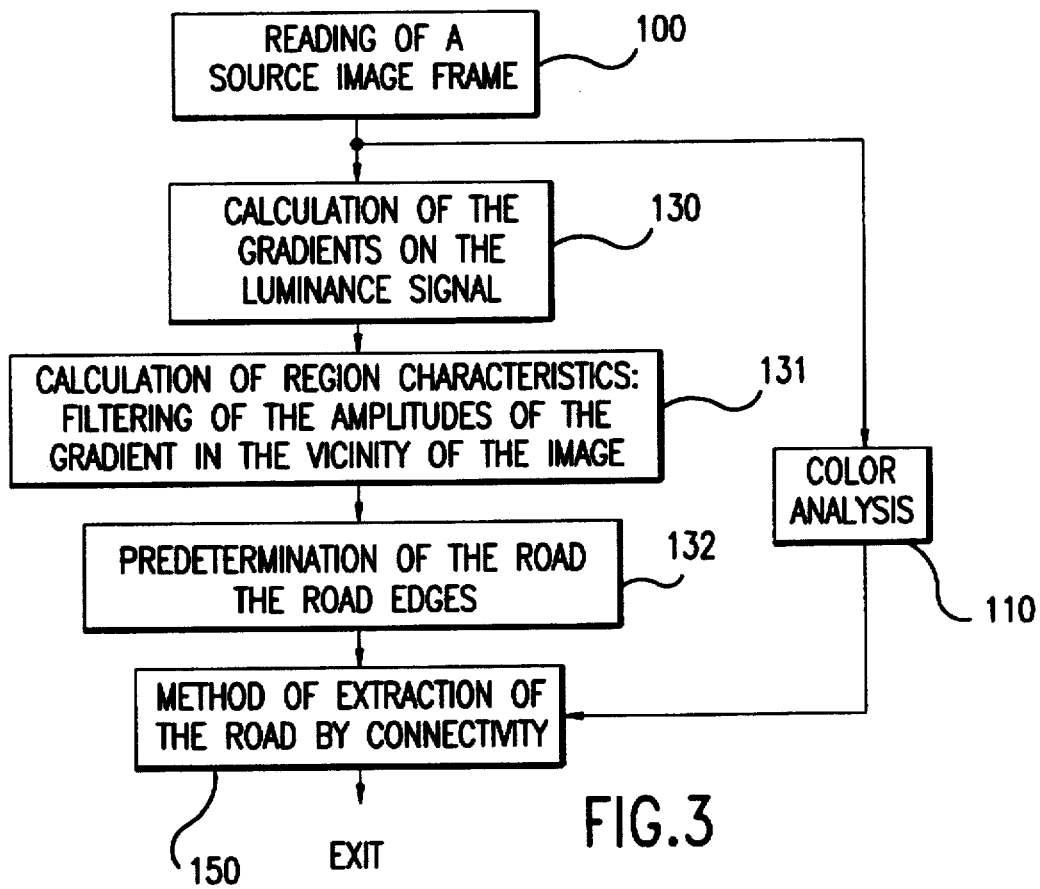
FIG. 3 is a flow chart of the image analysis method employed for extracting roads.

The contour/region analysis step of the processing is an essential step of the method. It uses the luminance signal, with the possibility of carrying out time-based sub-sampling (frame analysis) in order to reduce the processing time, this allowing a simpler architecture (related to the calculating time). The detailed flow chart for this contour/region analysis step carried out by the device 13 is illustrated in FIG. 3.

The source image is read in an image memory in a step 100. In order to do that, the values of the luminance signal of one frame are held in a table itab, of given dimensions (icol, ilin), icol and ilin being respectively the numbers of columns and of lines of the table. Each element of this table is coded over 8 bits, the luminance signal being quantified over 256 levels.

The calculation of the amplitude of the contours is carried out in a step 130 with the aid of gradient operators which are known convolution masks, of "PREWITT" type, in the horizontal and in the vertical. These convolution masks, of small dimensions (5×5) lend themselves well to a real-time implementation by virtue of the structure of their kernel (binary addition and subtraction).

Figure 4:
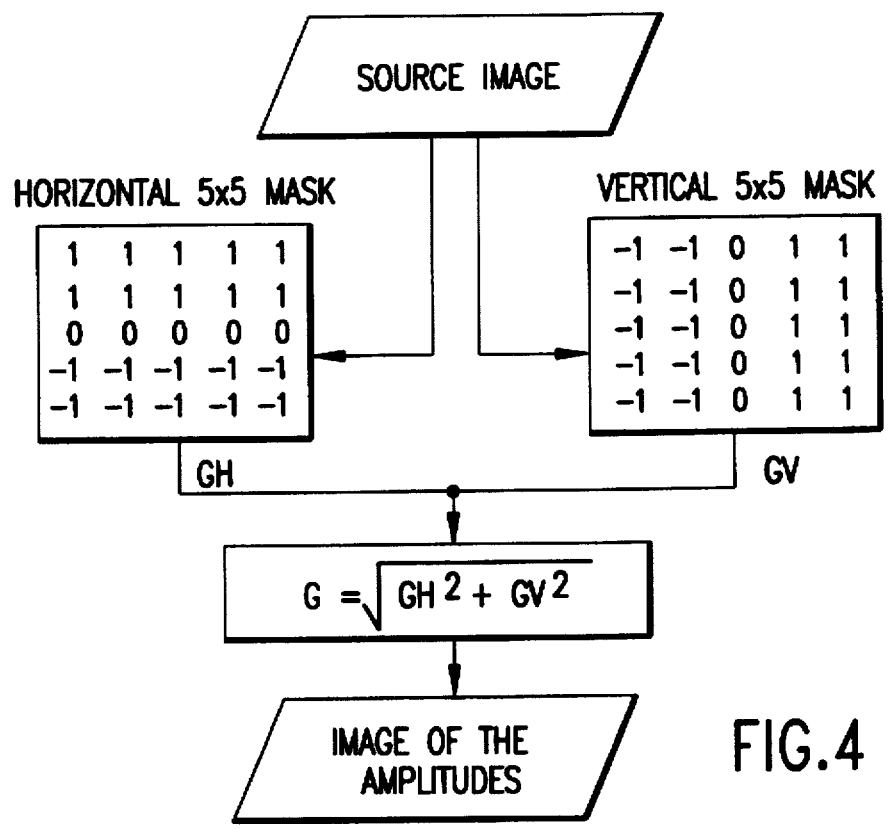
FIG. 4 is a detailed flow chart of the phase of calculating gradients from the luminance signal.

The horizontal and vertical masks used are represented in FIG. 4 which details the flow chart for the phase 130 of calculating the gradients on the luminance signal. The source image is convoluted by the 5×5 masks, horizontal and vertical respectively, which leads to the horizontal GH and vertical GV gradient values. The amplitude of the gradient G at each point is then calculated by the formula $$G = \sqrt{GH^2 + GV^2}$$

An image of the contours is then formed by the image of the amplitudes of the gradients thus calculated.

Thus, at the end of the phase 130, a table is obtained with dimensions (icol, ilin) representing the result of the calculation of the image of the amplitude of the contours, coded over 16 bits for each image point.

The calculation of the region characteristic is done in a step 131 (FIG. 3) on the basis of this image of the amplitudes of the gradients of the luminance signal. From the image of the contours, obtained in the preceding step, this operation includes in carrying out an averaging filtering on the image of the amplitudes of the gradients, with a small support (5×5 masks). The aim is to obtain information relating to the energy of the signal in the near vicinity of the point in question, avoiding the problems of noise and of quadratic detection. The energy, calculated in a conventional way, is equal to the square of the measured signal in a window centered on the current point. In order to reduce the calculation time, and by reason of the close results obtained, only the simple value of this signal has been used in one embodiment of the invention. At the output, a table with dimensions (icol, ilin) is thus obtained, representing the result of the calculation of the "region" characteristic, coded over 8 bits for each image point. This new "image" is denoted INRJ. The road edges are then predetermined in a step 132 from the image INRJ: a thresholding is carried out in order to retain only the levels which are high relative to the contours of the regions. A first detection of the road edges is then obtained with a better "confidence" than that which would have been obtained with a simple thresholding on the original image. This step is completed by a processing intended to make the detected contour segments related with the color analysis of step 110, described below.

The analysis of the color components, step 110 in FIG. 3, carried out by the color analysis device 11 of FIG. 2 makes it possible to validate the mask of the road obtained by the analysis of the luminance signal (contours/regions). It is not a question here of arriving at a segmentation of the scene, as described above, in the conventional sense of the term, but rather of taking account of the intrinsic qualities of the information present in these color signals, in order to arrive at a segmentation of the road confirmed with good reliability, and considerable robustness. Moreover, it is necessary for this procedure of segmentation of the road to be carried out at a video or near-real time rate.

The segmentation method used in the color analysis phase of the method according to the invention and described below has been motivated by the architectural aspect with a view to implementation in high-speed circuits, as well as by the assumptions according to which characteristic information may be found, specifying whether or not the analyzed regions belong to the road.

According to the invention, the color analysis performs a distribution into just two classes: road and non-road. An image point is represented by a triplet of R-G-B color values. The space of the characteristics to be processed is thus immediately defined.

The starting assumption is that the discrimination of the road may be accomplished by the observed fact that the latter includes no green or red colorimetric dominant. The constituents of the roadways generally mean that the surfacing has a blue or gray hue.

Figure 5:
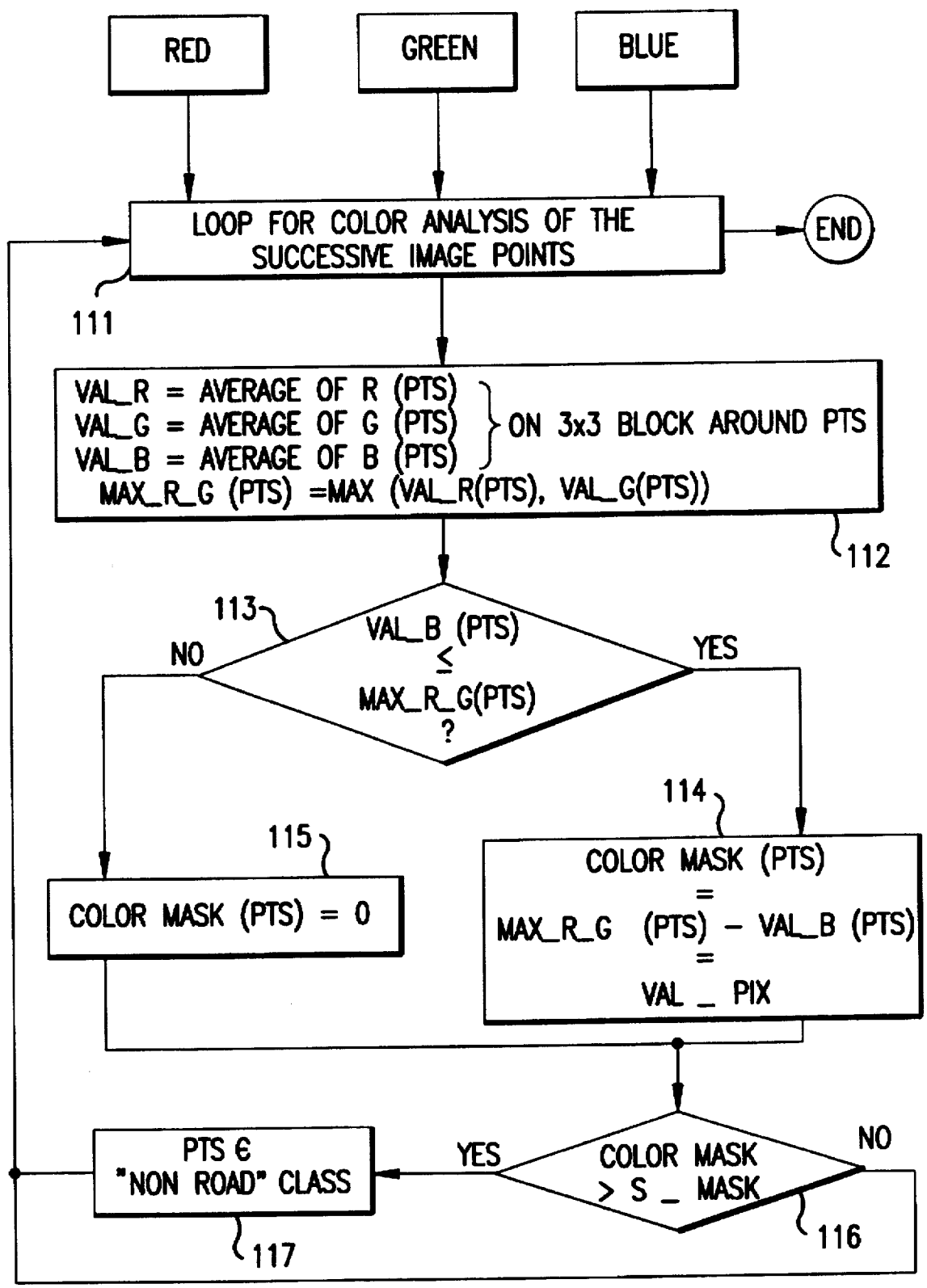
FIG. 5 is the flow chart of the color analysis phase.
Figure 6:
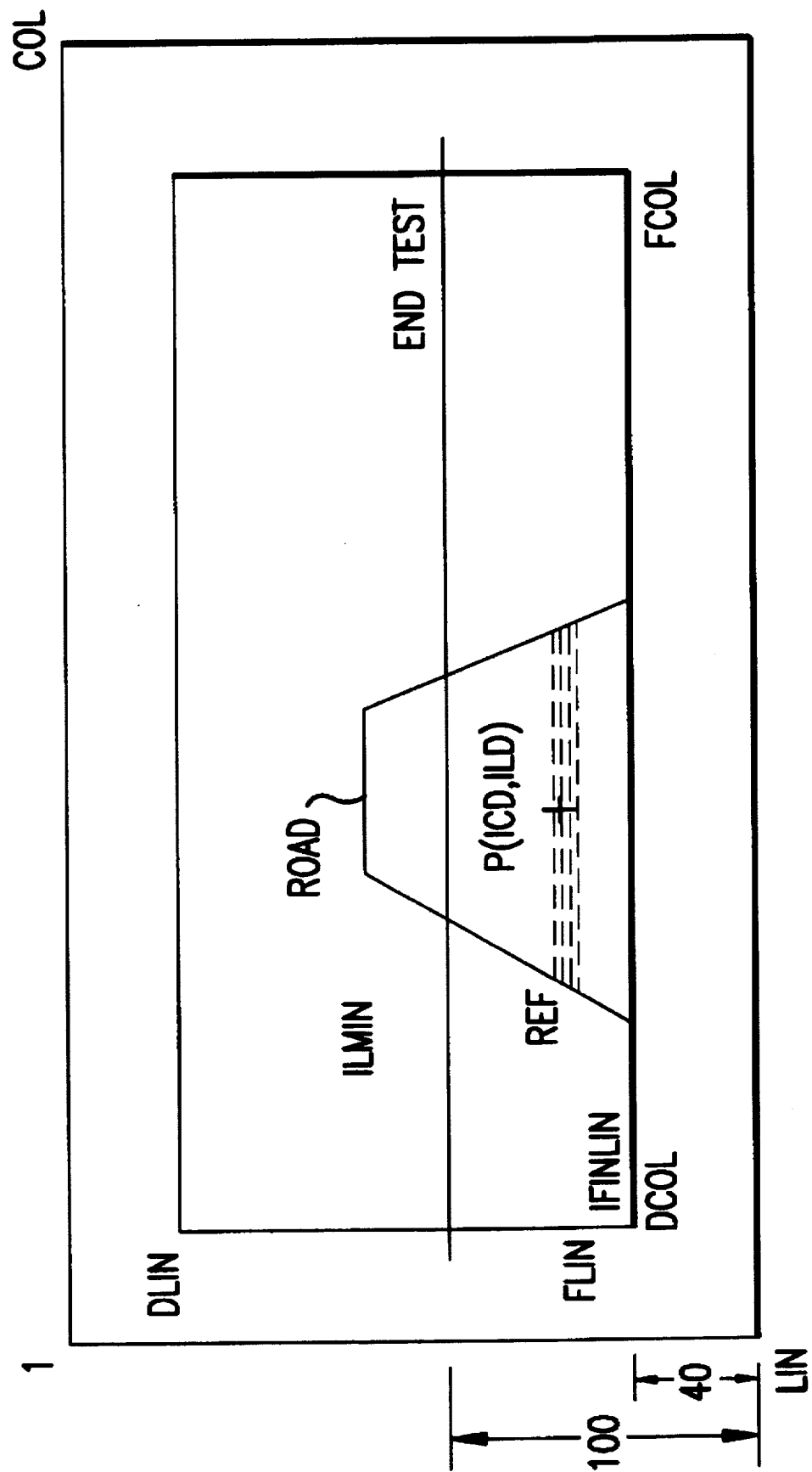
FIG. 6 is an explanatory diagram.

The color analysis, the flow chart of which is illustrated by FIG. 5, searches for the image points for which the deviation between discriminant information for the "road" and "non-road" classes is a maximum. The color analysis determines the points at which the maximum deviation exists between the average blue component and the average red or green components. In order to do that, a loop for color analysis of the image 111 describes the successive points of the image and, on the basis of the red, green and blue components, controls the calculation of the values at step 112.

Let VAL-R, VAL-G and VAL-B be the respective values of the red, green and blue components of one image point, averaged over the 3×3 blocks around the point, and let Max-R-G be the maximum value of the 2 VAL-R and VAL-G components calculated in a step 112. A value VAL-PIX of the color mask is attributed to the image point analyzed in step 114, if the test 113 is satisfied, that is to say the average blue component of the point is of an intensity lower than or equal to the value MAX-R-G, otherwise the mask is set to zero in step 115. This value VAL-PIX is equal to the deviation between the values M-R-V and VAL-B.

In the course of the test 116, if the deviation VAL-PIX is recognized as being higher than a given threshold S-MASK, the point in question is allocated to the "non-road" class, step 117.

The points of this mask represent only a part of the non-road class, but they are advantageously positioned in such a way that they generally reinforce a determination of the road edges and boundaries.

It is possible to improve the detection, by carrying out a low-pass filtering of averaging type, with (3×3) support, before the decision to allocate points to the "non-road" mask.

The averaging operation is carried out in video real time, with the aid of high-speed circuits.

The last step of the phase of extracting the road is then carried out on the basis of the merging of the information previously obtained from the two analyses of the luminance and color signals, in order to extract the carriageways, or roads, in a precise way. This step 150 (FIG. 3) is the extraction of the road on the basis of the superposition of the contour and "non-road" mask information.

The problem of detecting the road is resolved by the filling, or "coloring" of the region delimited by the road edges which have become related segments, via the various preceding operations. The benefit of closing regions by the "non-road" mask resides in the possibility of covering an entire region without "overflow", thereby avoiding having a mask including leakage points.

This extraction phase 150, carried out by the extraction device 15 (FIG. 2) is illustrated by FIGS. 6 to 9 and consists, in the first place, in indexing a point internal to the designated contours corresponding to the road, automatically by making the assumption of the presence of the road in front of the vehicle; after which a "filling" algorithm carries on filling in the road, along the horizontal and vertical scanning directions, up to the contour points where the filling stops. These contour points are the road-edges boundary points, contours originating from the luminance and limits of the "non-road" mask.

Figure 7:
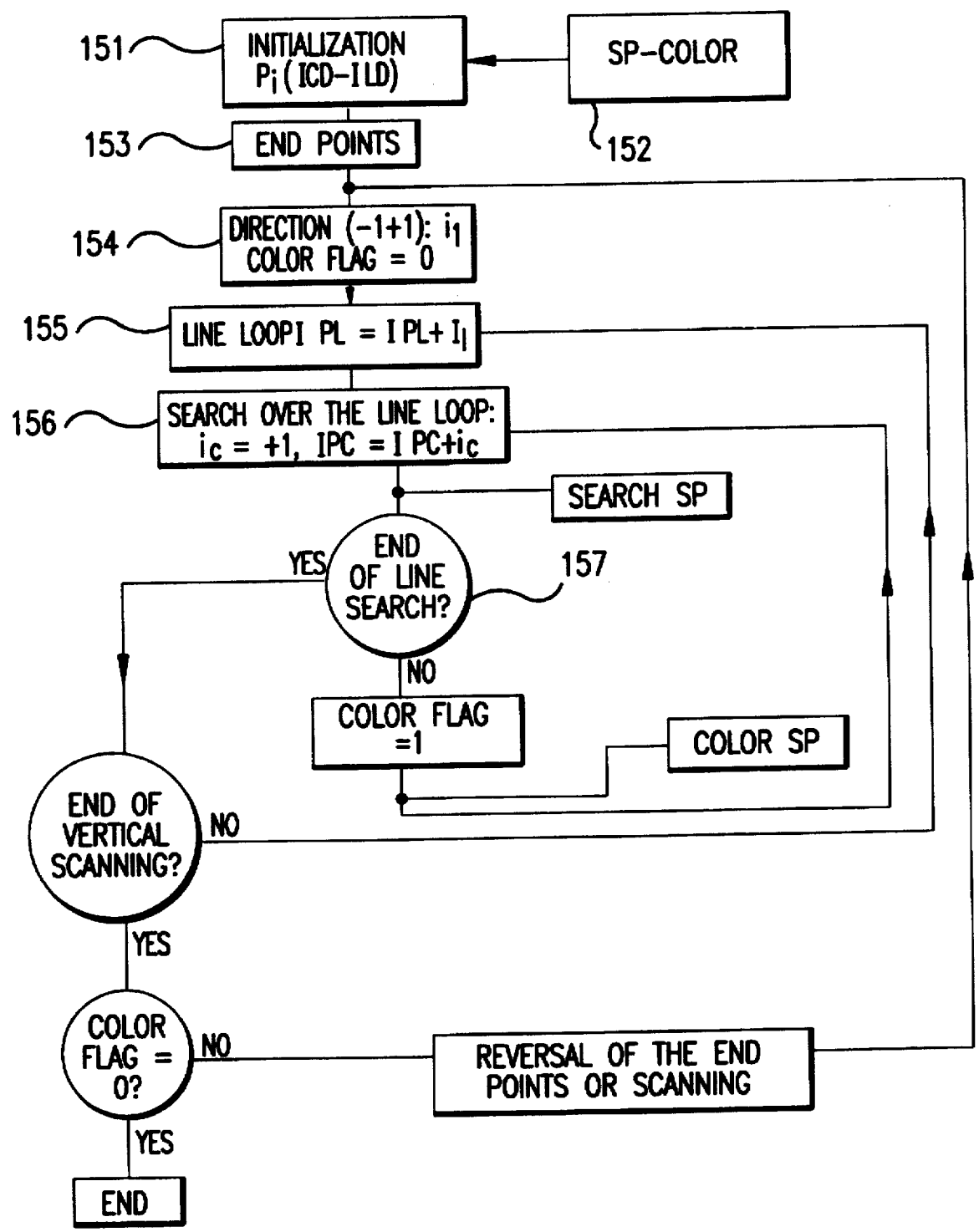
FIG. 7 is a flow chart of the phase of filling in the mask of the road.
Figure 8:
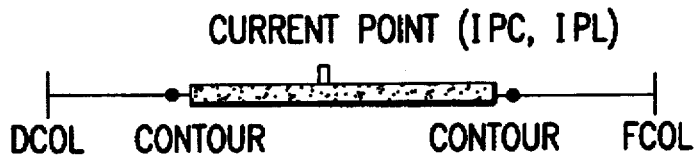
FIGS. 8 and 9 are explanatory diagrams of the filling function.

According to one embodiment, given by way of example, the extraction method makes use, for the filling, of the notion of connectivity. The procedure of filling the road mask is described below with the aid of the following variables illustrated in FIG. 6, and is illustrated by FIG. 7;

the starting image is dimensioned (COL, LIN);

the camera fixes the optical sighting center of the vehicle, and the starting assumption is that the road is situated in front of the latter;

(IPC, IPL) are the coordinates of the current point and (ICD, ILD) that of the start point $P_i$ of the analysis, respectively in column and in line with, for example: ILD=LIN−100 and ICD=COL/2 so that the initialization point $P_i$ is centered in line, and placed at the bottom of the image corresponding to the scene close to the vehicle, this being done so as to avoid the problems of possible obstacles at a longer range. An initialization phase 151 then calls a subprogram SP-COLOR 152, which colors in all the points of the line from the start point between the limits constituted by the contour points on this line, as FIG. 8 shows.

Figure 9:
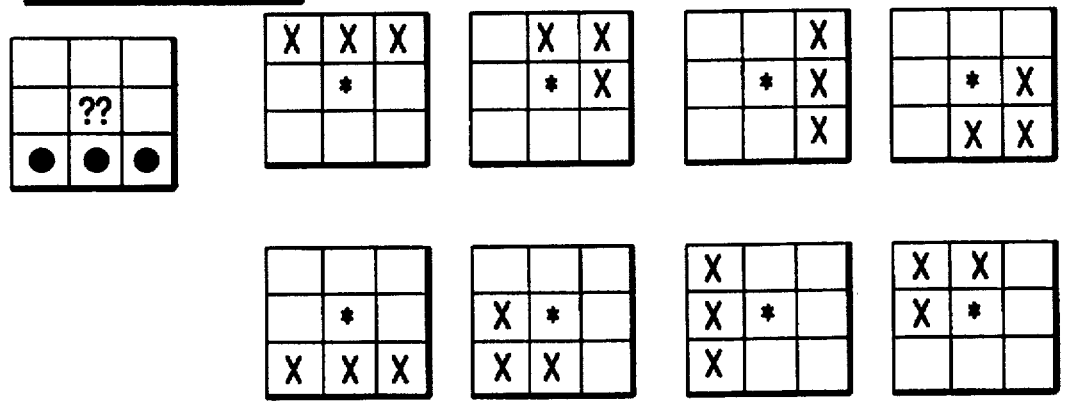

When this initialization of the line, from the start point, is finished, filling of the mask of the road can then actually commence. It makes it possible to search, line by line, for the points belonging to the road which are capable of being "colored in" on the basis of the analysis of a (3×3) window centered on the current point of the line being scanned. The condition of the test carried out is that the point must be different from a contour point or from an already-colored point, and that it must have at least 3 adjacent colored points. FIG. 9 illustrates the eight possibilities which lead to the coloring of the current point if it is not either a point of the contour, or already marked; the current point is the central point of the 3×3 window denoted * and the adjacent points which are already colored are marked "x".

The end points of the mask of the road to be colored resulting from the merging of the contour and road edges information are stored in memory in a step 153. A vertical scanning direction for line-by-line analysis is fixed in a step 154 by means of a vertical iteration index $i_1$, first of all at +1 for example. The analysis is carried out line-by-line by a line loop 155. Then a line search loop is performed, 156, with an index $i_c$ set to +1, then to −1, in order to initiate a scanning direction for the line. The test 157 of the 3×3 window around the current point is then implemented for each point of the line by a line search subprogram SP-RECH which, after each iteration of the rank of the column, IPC=IPC+$i_c$ of the current point, tests whether or not this point should be colored in, according to the configurations illustrated by FIG. 8, that is to say whether it belongs to the mask of the road. When the point is colored in, a value "FLAG-COLOR" associated with this point, and initially at 0, is set to 1. When the current point is a contour point, a return to the point of initialization of the line and a change of column index $i_c$=−1 make it possible to describe the other half-line from this point up to a contour point. The search for the points to be colored in on this line in order to obtain the mask of the road is then terminated and the same search is carried out over an adjacent line by iteration of the rank of the line IPL=IPL+$i_1$.

The coloring of the area commences with the line ILREF, with ordinate ILD, and terminates at the line IFINLIN=LIN−40. When the last usable line is colored in, the line index is brought back to the starting index ILD and the same method is used for marking the upper area from the line coordinate ILD up to the stop line of the filling with vertical coordinate ILMIN on the basis of a modified vertical index $i_1$=−1. The stop line ILMIN is given by an "upper contours" line detected at the end of the analysis of the contours and closing the road mask. This step marks all the points internal to the contour points, assigning them a level denoted "road-lev" and culminates in the formation of a "mask of the road".

As indicated above, the contour/region information allows a detection of the road edges. It also makes it possible to establish a location of the potential obstacles situated on the road, in front of the vehicle.

The color information accentuates the confidence in the mask of the road initially obtained, especially in the case in which no clear cut edges exist at the boundaries of the road. This second mask makes it possible to close off the shoulder regions, thus making a global mask of the road easier to obtain.

Figure 10:
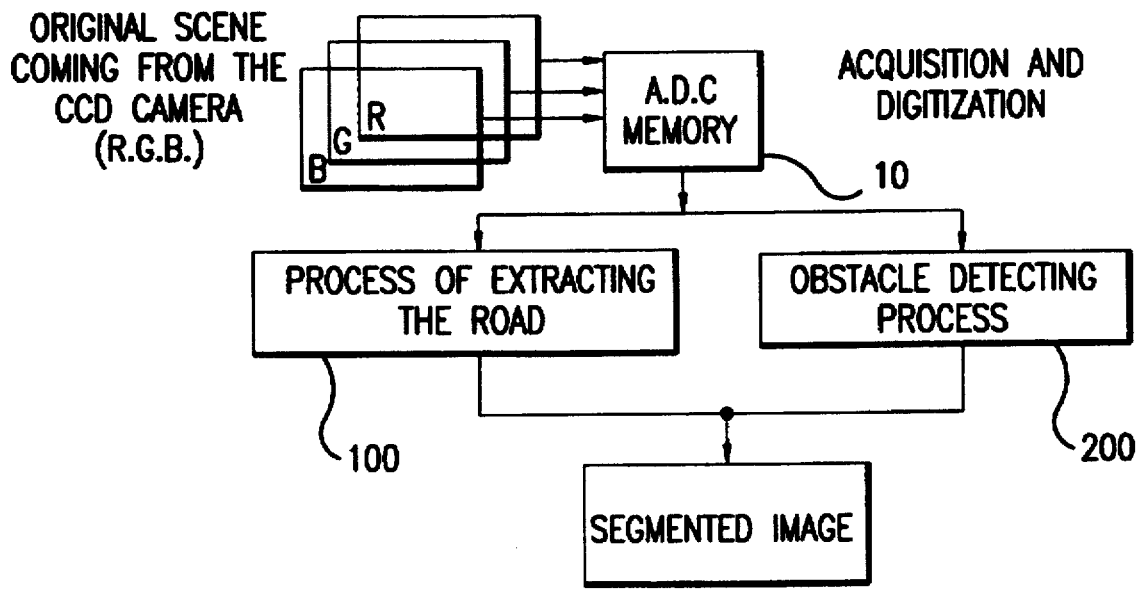
FIG. 10 is a block diagram illustrating the implementation of the method according to the invention in combination with an obstacle detection method, in an obstacle detection system applied to motor vehicle safety.

FIG. 10 illustrates the general structure of a motor vehicle safety system employing, on the basis of signals originating from the camera which are digitized and placed in the memory in the memory-type converter 10, a process of extracting the road and of locating potential obstacles 100, as described above, which is associated with an obstacle detection process 200 based on other data, as described with reference to FIG. 1.

The method according to the invention as described above aims to determine the carriageways on the roadway, on the basis of a process of static analysis of the luminance and color signals. This method may then be completed by a complementary phase to allow location of objects on the road, and pre-determination of major obstacles by a dynamic analysis. In fact, a dynamic analysis is necessary to separate the various types of objects detected by detection of movement in the sequences of images so as to identify objects on the road and to locate the obstacles. The resultant segmented image then reveals the obstacles situated on the road.

The invention is not limited to the precise description of the method given above. In particular, for the phase of extracting the road, the method by connectivity may be replaced by any other method making it possible to fill the mask of the road, the contours of which have been determined by the image of the amplitudes of the gradients and confirmed by the color analysis, for example a method of a vectorial type or any other suitable method which might make it possible to increase the speed of the processing. Likewise, the dimensions of windows for the averaging may be modified as can the other parameters, the numerical values of which have been given by way of example, without departing from the scope of the invention.

We claim:

1. A method of analyzing sequences of image video signals, taken by a camera on board a vehicle, for extracting a contour of a road from the image video signals, comprising the steps of:

analyzing luminance information of the image video signals to extract contours and regions from the image video signals to generate a mask signal of the road;

analyzing color information of the image video signals comprising the substeps of:

determining average blue, red and green components for points in the image video signals;

comparing the average blue components with the average red and green components for the points in the image video signals; and determining points at which a deviation between the average blue components and the average red or green components in the image video signals exceeds a first predetermined threshold; and combining the mask signal of the road from the analyzed luminance information with the determined points from the analyzed color information to extract the contour of the road.

2. The method according to claim 1, wherein the step of analyzing the luminance information further comprising the substeps of:

calculating gradients of the luminance information of the image video signals, the gradients having amplitudes;

forming an image of contours formed of a plurality of image points from the amplitudes of the gradients of the luminance information;

generating energy values of the energy of each of the plurality of image points based on the image of contours;

thresholding the energy values of each of the plurality of image points by comparing the energy values with a second predetermined threshold, and retaining only the energy values which exceed the second predetermined threshold, the mask signal of the road being generated based on the retained energy values.

3. The method according to claim 1, wherein the steps of analyzing the luminance information and analyzing the chrominance information are executed in parallel.

4. The method according to claim 1, wherein the steps of analyzing the luminance information and analyzing the chrominance information are executed in parallel.

5. A system of analyzing sequences of image video signals, taken by a camera on board a vehicle, for extracting a contour of a road from the image video signals, comprising:

first analyzing means for analyzing luminance information of the image video signals to extract contours and regions from the image video signals to generate a mask signal of the road;

second analyzing means for analyzing color information of the image video signals, the second analyzing means comprising, means for determining average blue, red and green components for points in the image video signals, means for comparing the average blue components with the average red and green components for the points in the image video signals, and means for determining points at which a deviation between the average blue components and the average red or green components in the image video signals exceeds a first predetermined threshold; and combining means for combining the mask signal of the road from the analyzed luminance information with the determined points from the analyzed color information to extract the contour of the road.

6. A system according to claim 5, wherein the analyzing means for analyzing the luminance information further comprises:

calculating means for calculating gradients of the luminance information of the image video signals, the gradients having amplitudes, the amplitudes of the gradients constituting an image of contours formed of a plurality of image points from the amplitudes of the gradients of the luminance information, and for generating energy values of the energy of each of the plurality of image points based on the image of contours; and thresholding means for thresholding the energy values of each of the plurality of image points by comparing the energy values with a second predetermined threshold, and retaining only the energy values which exceed the second predetermined threshold, the mask signal of the road being generated based on the retained energy values.

7. The method according to claim 6, wherein the first analyzing means for analyzing the luminance information and the second analyzing means for analyzing the chrominance information operate in parallel.

8. The method according to claim 5, wherein the first analyzing means for analyzing the luminance information and the second analyzing means for analyzing the chrominance information operate in parallel.

* * * * *

UNITED STATES PATENT AND TRADEMARK OFFICE
CERTIFICATE OF CORRECTION

PATENT NO. : 5,706,355
DATED : January 6, 1998
INVENTOR(S) : Stephane RABOISSON, et al.

It is certified that error appears in the above-indentified patent and that said Letters Patent is hereby corrected as shown below:

On the title page, item [63], the PCT filing date should be:

--Apr. 14, 1992--

Signed and Sealed this

Twenty-fourth Day of March, 1998

*Attest:*

BRUCE LEHMAN

*Attesting Officer*   *Commissioner of Patents and Trademarks*